United States Patent
Locatelli et al.

(10) Patent No.: US 10,436,675 B2
(45) Date of Patent: Oct. 8, 2019

(54) METHOD FOR MONITORING A ROLLING BEARING USED FOR SUPPORTING A ROTATING COMPONENT OF A MACHINE

(71) Applicant: CAMOZZI DIGITAL S.R.L., Brescia (IT)

(72) Inventors: Cristian Locatelli, Brescia (IT); Luca Testi, Brescia (IT); Luca Soliani, Brescia (IT); Rosario Assenza, Brescia (IT); Matteo Giavarini, Brescia (IT)

(73) Assignee: CAMOZZI DIGITAL S.R.L., Brescia (IT)

( * ) Notice: Subject to any disclaimer, the term of this patent is extended or adjusted under 35 U.S.C. 154(b) by 0 days.

(21) Appl. No.: 15/770,724

(22) PCT Filed: Oct. 20, 2016

(86) PCT No.: PCT/IB2016/056306
§ 371 (c)(1),
(2) Date: Apr. 24, 2018

(87) PCT Pub. No.: WO2017/072635
PCT Pub. Date: May 4, 2017

(65) Prior Publication Data
US 2019/0072456 A1 Mar. 7, 2019

(30) Foreign Application Priority Data
Oct. 29, 2015 (IT) ........................ 102015000066684

(51) Int. Cl.
*G01M 13/04* (2019.01)
*G01H 1/00* (2006.01)

(52) U.S. Cl.
CPC ............ *G01M 13/04* (2013.01); *G01H 1/003* (2013.01)

(58) Field of Classification Search
CPC ........ G01M 12/04; G01H 1/003; F16C 19/00; F16C 19/52; F16C 19/527
(Continued)

(56) References Cited

U.S. PATENT DOCUMENTS

| | | | | |
|---|---|---|---|---|
| 4,960,251 A | * | 10/1990 | Nyman | B61K 9/04 246/169 A |
| 7,769,564 B2 | * | 8/2010 | Church | B61K 9/04 246/169 A |

(Continued)

FOREIGN PATENT DOCUMENTS

| | | |
|---|---|---|
| CN | 1688874 A | 10/2005 |
| CN | 102246051 A | 11/2011 |

(Continued)

OTHER PUBLICATIONS

International Search Report and Written Opinion of the International Searching Authority for International Patent Application No. PCT/IB2016/056306 dated Jan. 13, 2017, 11 pages.

*Primary Examiner* — Eric Blount
(74) *Attorney, Agent, or Firm* — Merchant & Gould P.C.

(57) ABSTRACT

A method of monitoring a rolling bearing for a rotating member of a machine provides measuring, over time, the temperature values of the bearing or of a region surrounding the bearing. The method identifies temperature peaks in the temperature trend and highlights an alarm condition if the peaks satisfy an alarm criterion, for example the presence of five peaks in twelve operating hours of the machine.

6 Claims, 4 Drawing Sheets

(58) Field of Classification Search
USPC .......................................................... 340/82
See application file for complete search history.

(56) References Cited

U.S. PATENT DOCUMENTS

| | | |
|---|---|---|
| 8,904,856 B2 | 12/2014 | Wiebrecht et al. |
| 2011/0301871 A1 | 12/2011 | Budiscak et al. |
| 2015/0211581 A1 | 7/2015 | Murphy et al. |

FOREIGN PATENT DOCUMENTS

| | | |
|---|---|---|
| CN | 102918285 A | 2/2013 |
| CN | 104126108 A | 10/2014 |
| CN | 104236912 A | 12/2014 |
| EP | 0 029 763 A1 | 6/1981 |
| EP | 2 455 772 A2 | 5/2012 |
| GB | 2 429 020 A | 2/2007 |
| WO | 2016/016739 A1 | 2/2016 |

\* cited by examiner

METHOD FOR MONITORING A ROLLING BEARING USED FOR SUPPORTING A ROTATING COMPONENT OF A MACHINE

This application is a National Stage Application of PCT/IB2016/056306, filed 20 Oct. 2016, which claims benefit of Ser. No. 102015000066684, filed 29 Oct. 2015 in Italy and which applications are incorporated herein by reference. To the extent appropriate, a claim of priority is made to each of the above-disclosed applications.

BACKGROUND OF THE INVENTION

The object of the present invention is a method of monitoring a rolling bearing of a machine, for example a textile machine, aimed at identifying a deviation of the bearing from a nominal performance in order to avoid the breakage thereof.

As is known, in order for a plant, for example a spinning line, to be economically remunerative, there is a need for it to work continuously, without interruptions due to sudden breakages of the machine components. Breakages of the components unfortunately are instead often unpredictable and the repairs required to restore machine operation often involve stopping the production for a more or less lengthy interval of time.

It is therefore very important to intervene in time on the machines in the plant, by executing scheduled interventions or interventions controlled by the monitoring system before the break occurs. Such a maintenance management approach is known with the expression "predictive maintenance".

The monitoring system of physical quantities of machines of a spinning line set forth in International Application PCT/IB2015/053451 to the applicant, falls within such a background.

Typically, components having moving parts are involved in unexpected breakages due to fatigue and wear phenomena, conditions of use (for example, lack of adequate lubrication) or manufacturing defects of the component itself (for example, the presence of micro cracks or non-compliance of dimensional and geometrical tolerances).

The components most involved by unexpected breakages are the rolling bearings used for supporting in rotation the shafts of machines.

Today, monitoring systems of such bearings are known which by measuring amplitude, frequency or shape of the vibrating phenomena triggered by the bearings themselves, are capable of foreseeing the component breaking, often one or two hours before the breaking event occurs.

Due to the short notice, such systems unfortunately do not allow to schedule at best the stop of the machine and plant, and they force operators to perform sudden interventions.

SUMMARY OF THE INVENTION

The object of the present invention is to prepare a method of monitoring rolling bearings of machines, for example textile machines of a spinning line, which allows the deviation of the bearing from a nominal performance to be measured in order to predict the breaking event sufficiently in advance.

BRIEF DESCRIPTION OF THE DRAWINGS

The features and advantages of the method of monitoring according to the present invention will become apparent from the following description, given by way of a non-limiting example, according to the accompanying drawings, in which, for clarity, reference is made to machines of a spinning line.

In particular.

DETAILED DESCRIPTION OF THE PREFERRED EMBODIMENTS

For clarity of disclosure, explicit reference is made below to a textile machine, and in particular to a spinning frame of a spinning line; however, it is understood that the invention is applicable to any machine.

For example, the method according to the invention also is applicable to bearings for tool machine mandrels, bearings of machine members for cutting sheet (for example, of rotating members for unwinding the sheet coil or for cutting it), bearings for the rollers of printing machines, bearings of conveyor belts.

However, in particular, the invention can be applied to a spinning line, for example a blow room machine (such as a plucker, mixer, opener, mixing loader, scale loader or tuft blender), a carding machine, a combing machine (such as a drawing frame, lap winder or comber), a spinning machine (such as a roving frame or a spinning frame).

Figure 1:
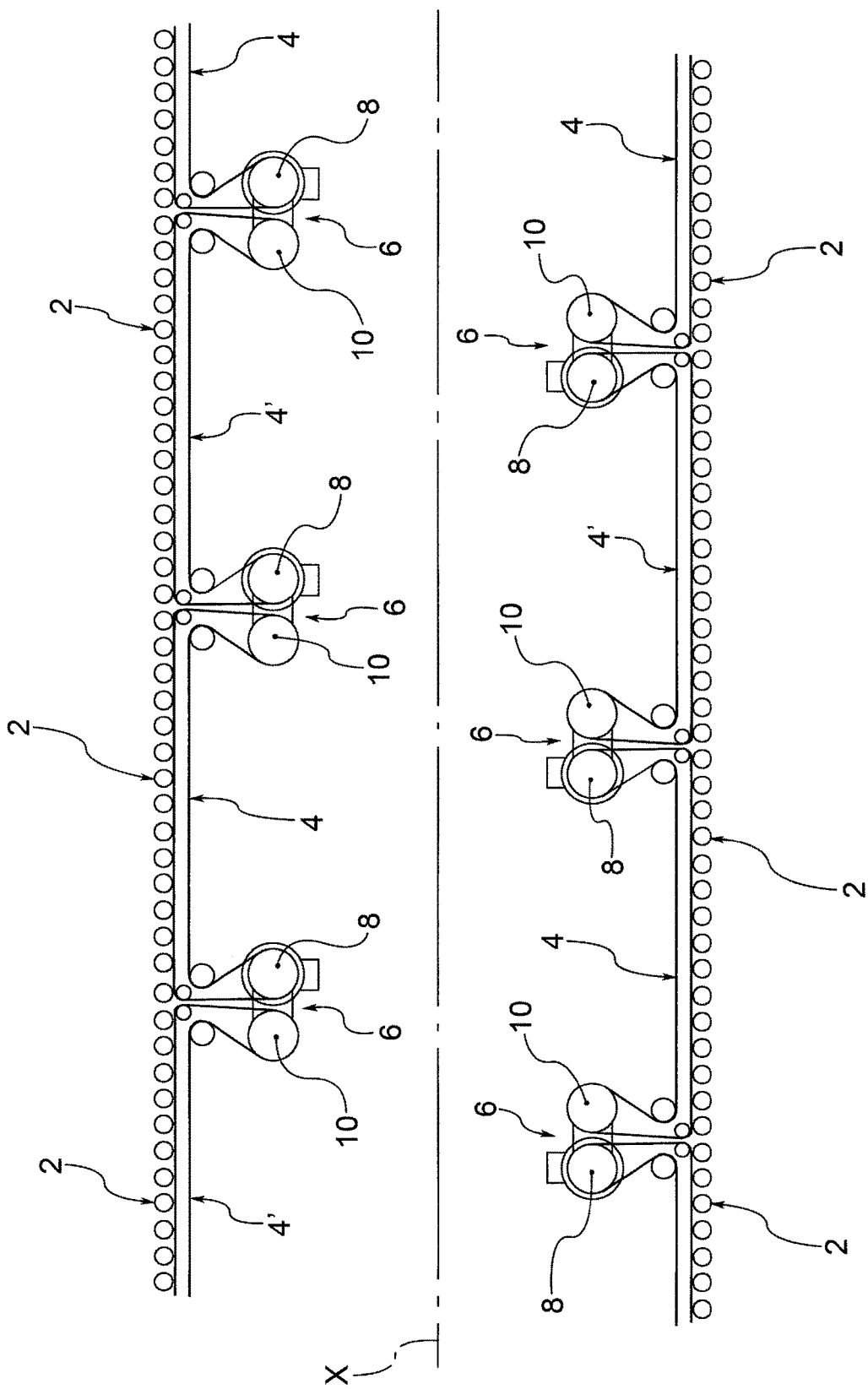
FIG. 1 shows a diagram of a spindle moving system of a spinning frame.

With reference to FIG. 1, a spinning frame comprises a plurality of vertical spindles 2, which are arranged aligned along a longitudinal axis X, typically organized in two opposite groups, in jargon called "banks" of the spinning frame.

A predefined number of spindles 2 is put in rotation about a respective rotation axis by a belt 4, 4', which in turn is moved by a moving unit 6 comprising an electric motor 8 and preferably an idler wheel 10.

Figure 2:
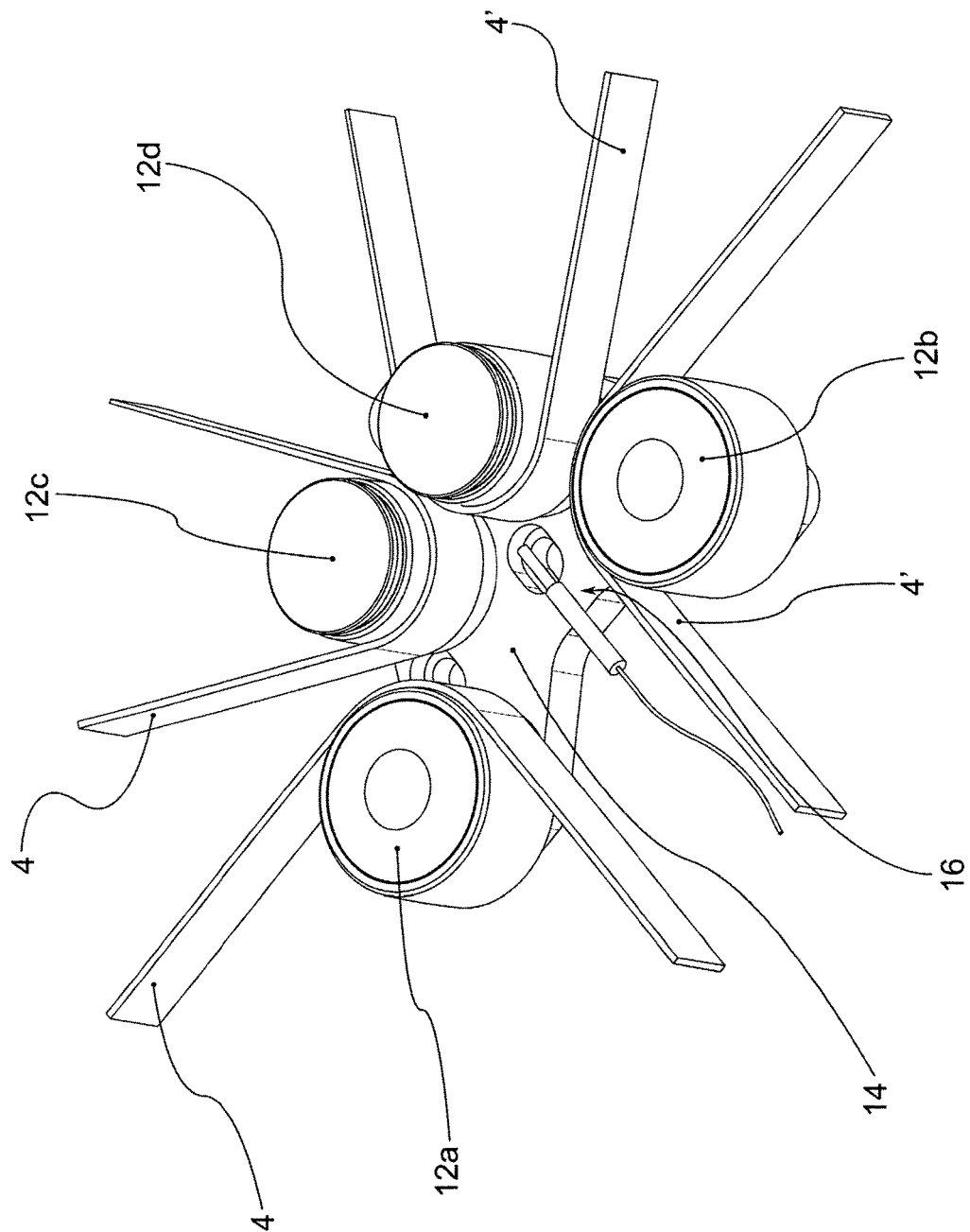
FIG. 2 diagrammatically shows a moving unit of the system in FIG. 1.

With reference to FIG. 2, each moving unit 6 comprises a plurality of idler pulleys 12a, 12b, 12c, 12d engaged with the belts 4, 4' to deflect the belts toward the spindles 2 or toward the side-by-side moving unit.

For example, said pulleys 12a-12d are supported by a single plate 14, preferably in an adjustable manner.

Each pulley 12a-12d comprises a respective rolling bearing for the support in rotation of the pulley.

The monitoring system according to the present invention comprises at least one temperature sensor 16 associated with each rolling bearing or with a group of rolling bearings located in a close manner.

For example, the temperature sensor is associated with the support plate 14 of the pulleys 12a-12d.

The temperature sensor is suitable for measuring the temperature in a region surrounding the sensor itself and the monitoring system typically comprises a plurality of temperature sensors and management means operatively connected with said temperature sensors for assessing the signals received.

For example, the temperature sensor is a thermoresistance.

According to the present invention, the method of monitoring provides collecting a group of temperature data comprising the temperature values measured by the temperature sensor.

In particular, the group of temperature data defines a trend over time of the temperature measured.

According to a preferred embodiment, the temperature is measured at preferably regular intervals of time, for example every minute.

According to alternative embodiments, the temperature is measured continuously.

According to the method of monitoring, a predefined time interval is also identified, for example equal to 12 hours, during which the spinning frame maintained the predefined working conditions, which remained unvaried during said interval of time.

Moreover, an assessment is made at regular intervals, for example every two hours, of the temperatures detected by selecting the last temperature value measured and the values of the group of temperature data measured in the predefined time interval, before the last temperature value measured. The temperature values thus selected define a selection of values.

In other words, the temperature trend is considered by taking into consideration the last measurement made and the measurements in the 12 hours preceding the last measurement. Such a trend constitutes the selection of values.

According to the method of monitoring, a predefined temperature threshold DT is also identified, for example comprised between 4° C. and 10° C., more preferably comprised between 5° C. and 6° C. (FIG. 3).

On the basis of said predefined temperature interval threshold, a temperature peak is defined according to the method of the invention, in that a temperature peak is identified in the selection of values each time that the temperature difference between one measurement and the one temporally successive is greater than, or equal to the interval threshold.

For example, if the interval threshold is set to 5° C., a temperature peak is identified in the selection of values each time that the temperature difference between one measurement and the successive one is greater than, or equal to 5° C.

Figure 3:
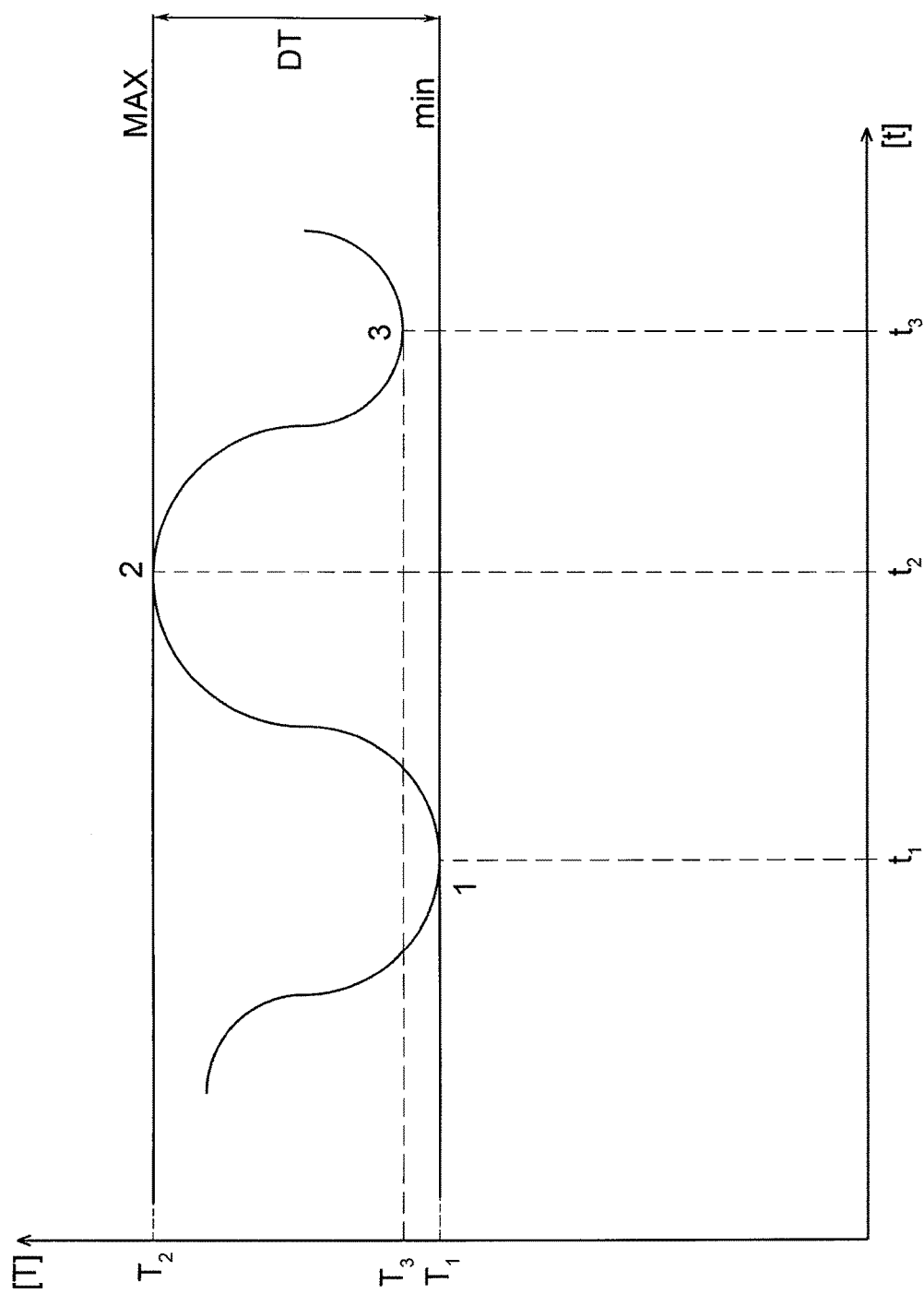
FIG. 3 depicts a temperature trend over time for identifying temperature peaks in accordance to the method according to one embodiment of the invention.

For example, according to the hypothetical trend in FIG. 3, the selection of values T1, T2, T3, corresponding to the temperatures measured at instants t1, t2, t3, highlights just one peak, because only the difference T2−T1 is equal to the interval threshold DT.

Such a peak constitutes an anomaly which deviates from the nominal performance of the bearing, which under optimal conditions, would tend to maintain a constant temperature for predefined working conditions.

Moreover, in accordance to the method according to the invention, a predefined alarm threshold number Np is identified, for example comprised between 4 and 6, for example equal to 5, based on which an alarm condition is signaled.

In particular, if a number of peaks is identified in the selection of values which is equal to, or greater than the threshold number, an alarm condition is caused whereby a deviation is measured from the nominal performance of the rolling bearing involved by such a measurement. Such an assessment constitutes an example of alarm criterion.

For example, if 5 peaks are identified in the selection of values, the method of monitoring provides signaling an alarm condition because a deviation is measured from the nominal performance used to start a maintenance procedure.

Figure 4:
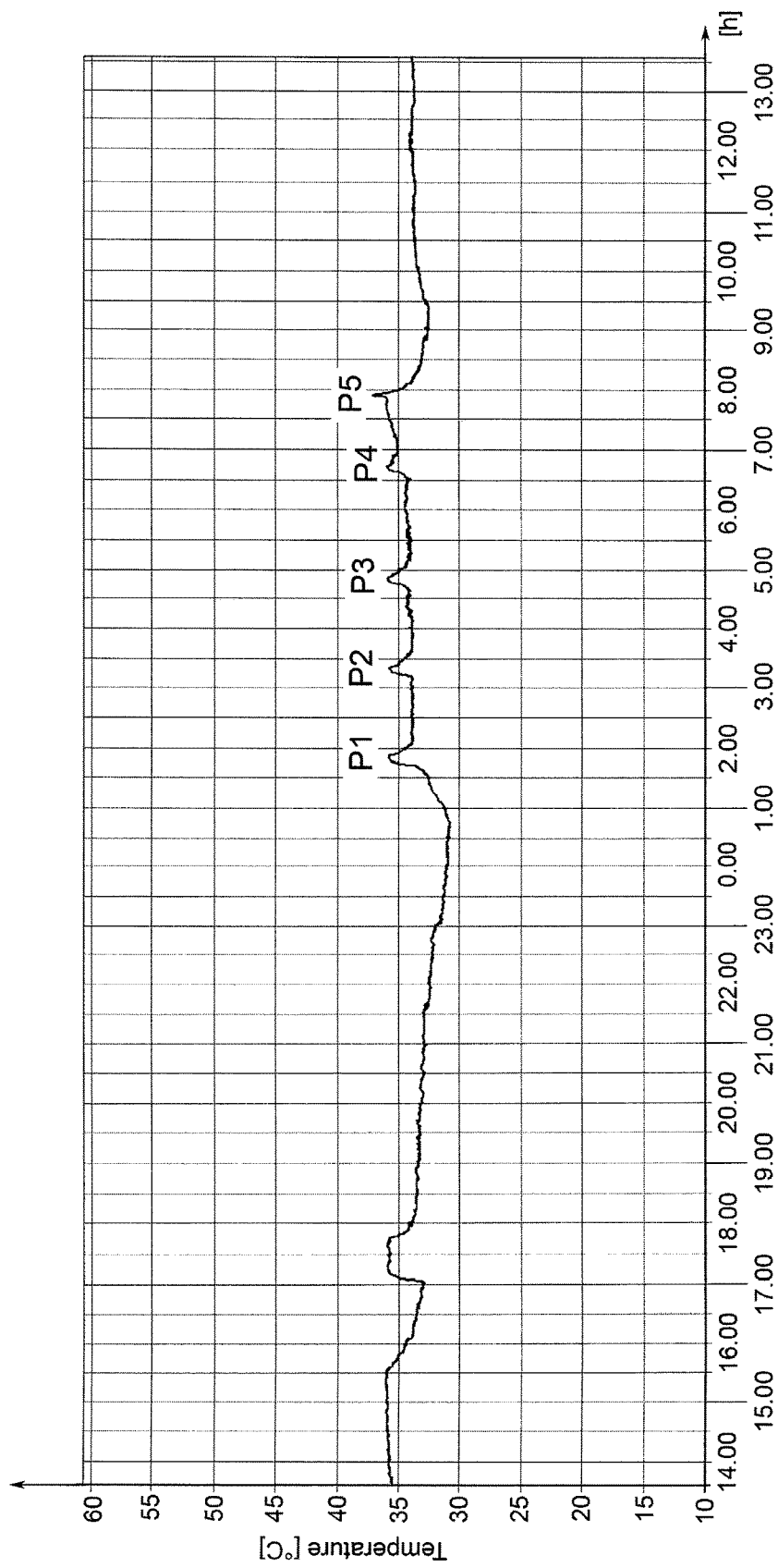
FIG. 4 shows a temperature trend over time for a bearing of the moving unit in FIG. 2.

For example, FIG. 4 refers to a real experimental case of applying the method of monitoring according to the present invention to a rolling bearing of a spinning frame.

In particular, FIG. 4 shows the temperature trend (° C.) according to the time (hours). At 8 am, 5 peaks p1-p5 are measured in the selection of values from 8:00 pm of the previous evening to 8:00 am, so as to generate an alarm signal.

When the method is applied to machines of a system, for example a spinning line, the system preferably comprises storage means operatively connected to said temperature sensor, for storing the temperature data measured over time, and electronic management means operatively connected to the storage means, programmed to execute the method of monitoring of the bearing.

According to a further embodiment, the system is located in a factory, the storage means are located in the factory or remotely with respect to said factory, while the management means are remote with respect to said factory and typically manage and assess the data originating from several plants.

The method of monitoring according to the present invention innovatively allows a deviation of a rolling bearing from a nominal performance to be effectively measured in good advance with respect to a breaking event, thus allowing the machine stop to be best planned for performing the required maintenance operations.

It is apparent that those skilled in the art may make modifications to the above-described method in order to meet contingent needs, without departing from the scope of protection as defined by the following claims.

The invention claimed is:

1. A method of monitoring a rolling bearing for a member of a machine, wherein said method comprises:
   measuring, over time, temperature values of the bearing or of a region surrounding the bearing to define a temperature trend over time, to identify temperature peaks in said trend of the temperature over time, and to highlight an alarm condition if said peaks satisfy an alarm criterion;
   wherein, to identify the temperature peaks, a predefined temperature threshold (DT) is identified and a temperature peak is identified each time that a temperature difference between one measurement and a temporally successive measurement is greater than, or equal to, said temperature threshold (DT);
   according to the alarm criterion, a predefined alarm threshold number (Np) is identified and an alarm condition is signaled if a number of peaks is identified equal to or greater than, said threshold number (Np).

2. The method according to claim 1, wherein the temperature threshold (DT) is between 4° C. and 10° C.

3. The method according to claim 1, wherein the threshold number (Np) is equal to 5.

4. The method according to claim 1, wherein the temperature is measured at discrete intervals of time.

5. The method according to claim 1, wherein the temperature is measured continuously over time.

6. The method according to claim 1, wherein a predefined time interval is identified and, for the identification of the peaks, the temperature trend is processed in the predefined time interval, before a last measurement.

* * * * *